United States Patent [19]
Snyder et al.

[11] Patent Number: 5,624,086
[45] Date of Patent: Apr. 29, 1997

[54] SEAT BELT RETRACTOR

[75] Inventors: Lloyd M. Snyder, Sterling Heights; Joseph G. Dick, Macomb, both of Mich.

[73] Assignee: TRW Vehicle Safety Systems, Inc., Lyndhurst, Ohio

[21] Appl. No.: 523,011

[22] Filed: Sep. 1, 1995

[51] Int. Cl.$^6$ ............................................. B60R 22/42
[52] U.S. Cl. ............................ 242/381.1; 242/383.4
[58] Field of Search ............................ 242/381.1, 383, 242/383.2, 383.4, 384, 384.6; 280/806, 807

[56] References Cited

U.S. PATENT DOCUMENTS

| | | |
|---|---|---|
| 3,074,761 | 1/1963 | Ryan . |
| 3,138,405 | 6/1964 | Hanway . |
| 3,467,337 | 9/1969 | Putman . |
| 4,350,313 | 9/1982 | Adomeit . |
| 4,899,949 | 2/1990 | Meyer et al. . |
| 4,928,902 | 5/1990 | Tsuji ........................... 242/383.4 |
| 5,029,770 | 7/1991 | Tanaka et al. . |
| 5,044,575 | 9/1991 | Knabel et al. . |
| 5,242,213 | 9/1993 | Fohl ............................. 242/381.1 |
| 5,460,338 | 10/1995 | Hirata et al. ................ 242/381.1 |
| 5,485,971 | 1/1996 | Nakaya et al. .............. 242/383.4 |

FOREIGN PATENT DOCUMENTS 2265815  10/1993  United Kingdom ................ 280/806

*Primary Examiner*—John P. Darling
*Attorney, Agent, or Firm*—Tarolli, Sundheim, Covell, Tummino & Szabo

[57] ABSTRACT

A vehicle seat belt retractor (10) includes a spool (170) on which seat belt webbing (16) is wound. The spool (170) is supported for rotation on hubs (102, 162). In a vehicle emergency, an actuator (230) rotates with the spool (170) and transmits force through first and second link arms (312, 314) to a belt webbing clamp mechanism (270) to block the withdrawal of belt webbing (16) from the retractor (10). In the event the primary belt locking mechanism (270) is unable to block the withdrawal of belt webbing (16) from the retractor (10), the spool (170) continues to rotate. The first link arm (312) moves relative to the second link arm (314) to enable the actuator (230) to continue to rotate, actuating a secondary belt locking mechanism (200, 178), without damaging parts of the retractor (10).

16 Claims, 5 Drawing Sheets

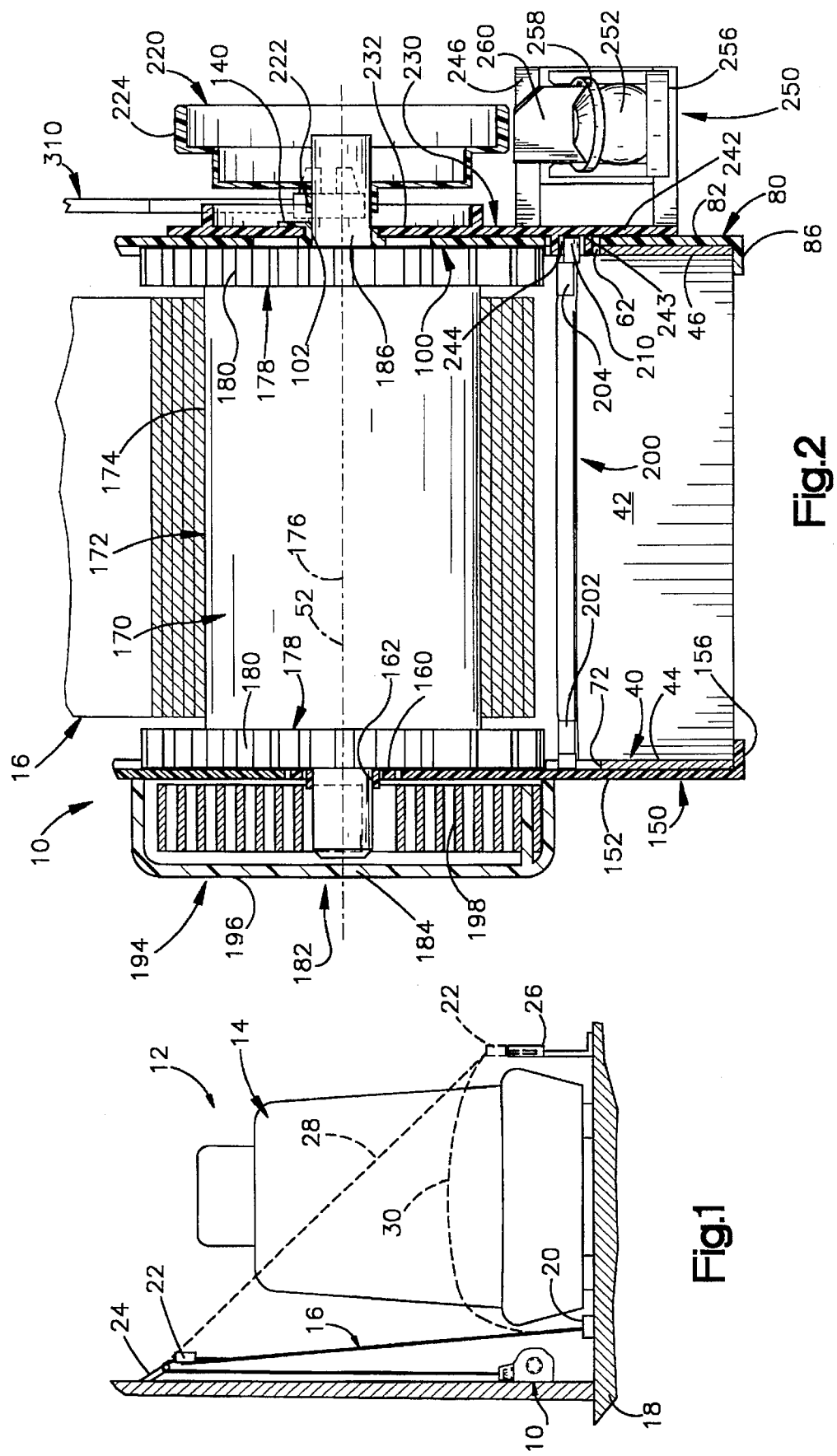

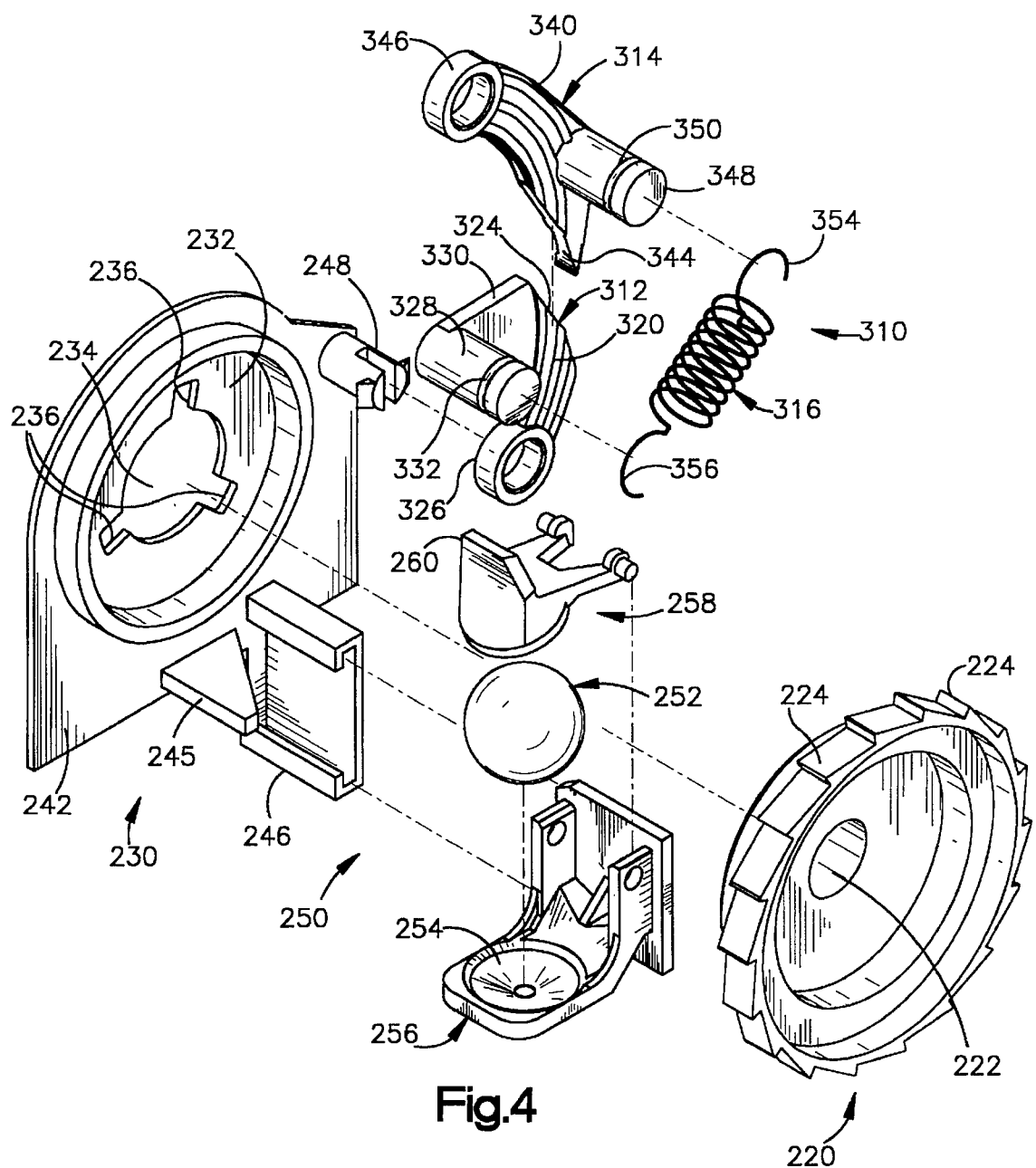

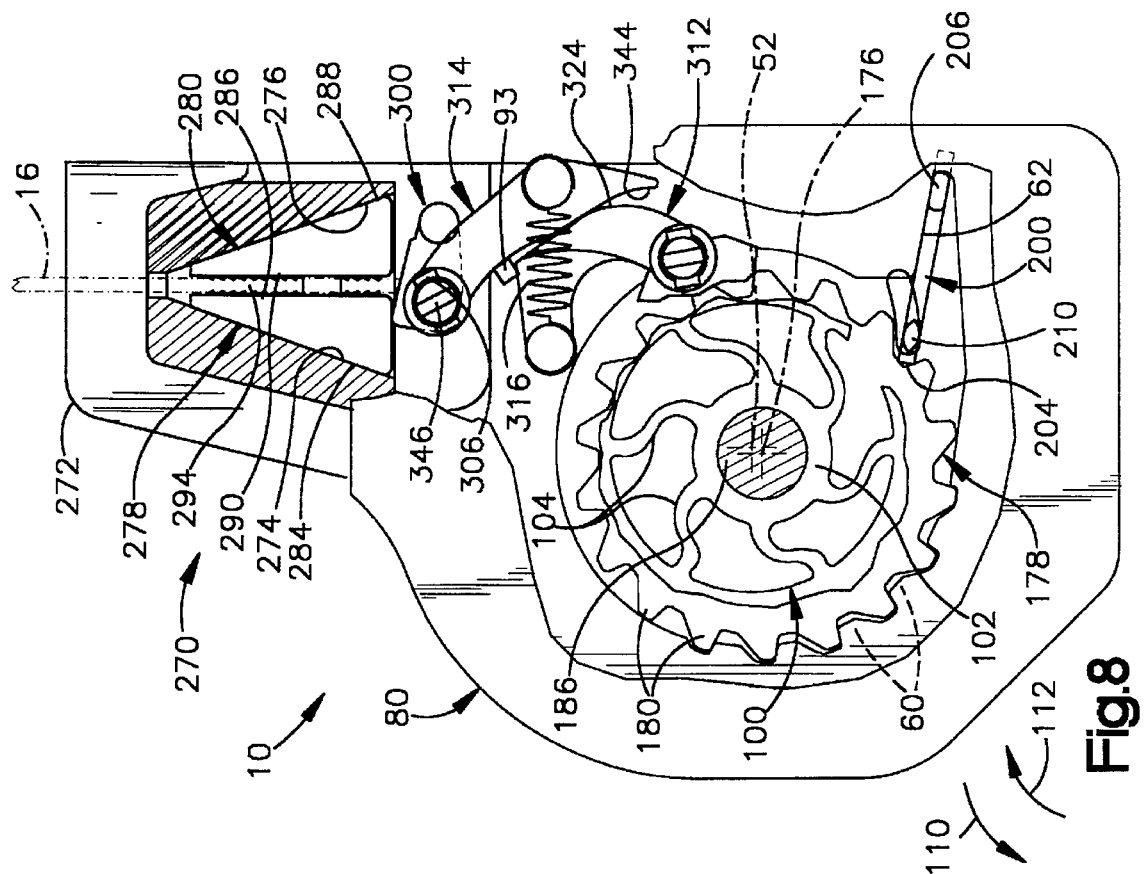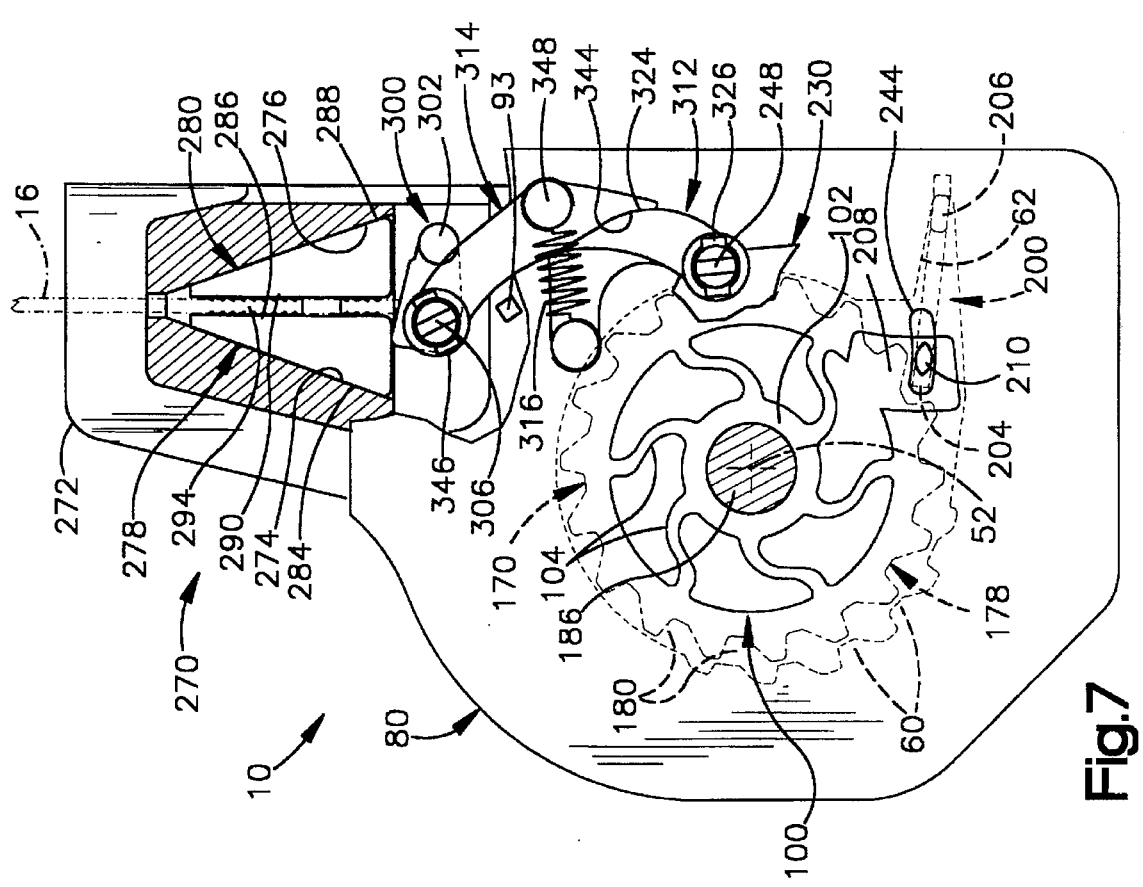

5,624,086

SEAT BELT RETRACTOR

BACKGROUND OF THE INVENTION

1. Technical Field

The present invention relates to a vehicle seat belt webbing retractor, and, in particular, to a retractor including a belt webbing clamp assembly for blocking withdrawal of belt webbing from the retractor.

2. Description of the Prior Art

A known seat belt system to restrain a vehicle occupant includes a length of belt webbing wound on a spool of a seat belt webbing retractor. The belt webbing is extensible about a vehicle occupant to restrain the occupant. In the event of a vehicle emergency, the vehicle occupant moves forward in the vehicle relative to the vehicle seat, belt webbing is withdrawn from the spool, and the spool rotates in a belt withdrawal direction. Force is transmitted from the rotating spool to actuate a belt webbing clamp assembly to block the withdrawal of belt webbing from the retractor. If the belt webbing clamp assembly does not block withdrawal of belt webbing and the spool continues to rotate, the force exerted by the rotating spool can damage parts of the retractor.

SUMMARY OF THE INVENTION

The present invention is a seat belt retractor comprising a length of seat belt webbing which is extensible about a vehicle occupant to restrain the vehicle occupant. A spool on which the belt webbing is wound is rotatable in a belt retraction direction and in an opposite belt withdrawal direction. A belt webbing clamp mechanism has a released condition in which the belt webbing is movable through the clamp mechanism and a clamping condition in which the clamp mechanism clamps the belt webbing to block the withdrawal of belt webbing from the retractor. The retractor includes sensing means for sensing a vehicle emergency situation. An actuator is movable in a first direction from a first position to a second position in response to the sensing means sensing an emergency situation. First means is connected between the actuator and the clamp mechanism for actuating the clamp mechanism when the actuator moves to its second position. The first means includes second means for disabling the first means in the event of inability of the clamp mechanism to block the withdrawal of belt webbing from the retractor.

BRIEF DESCRIPTION OF THE DRAWINGS

Further features of the present invention will become apparent to those skilled in the art to which the present invention relates from reading the following specification with reference to the accompanying drawings, in which:

FIG. 1 is a schematic illustration of a vehicle seat belt system including a seat belt webbing retractor in accordance with the present invention;

FIG. 2 is a longitudinal view partially in section of portions of the retractor of FIG. 1;

FIG. 4 is an enlarged view of a portion of FIG. 3;

FIG. 7 is a view similar to FIG. 6 showing other parts of the retractor of FIG. 1 including a secondary belt locking mechanism in an unactuated condition; and FIG. 8 is a view similar to FIG. 7 showing the secondary belt locking mechanism in an actuated condition.

DESCRIPTION OF PREFERRED EMBODIMENT

Figure 3:
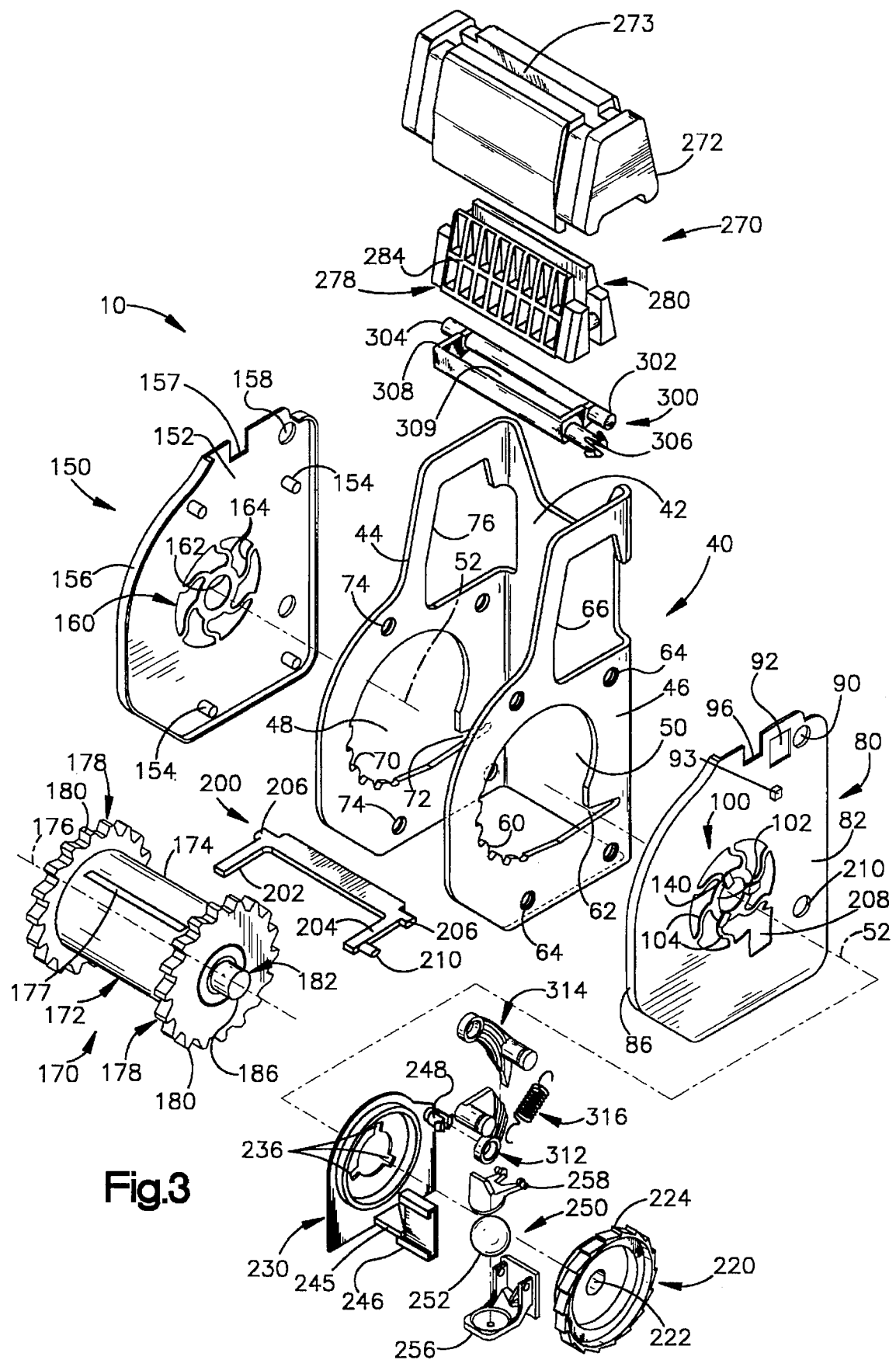
FIG. 3 is an exploded perspective view of the retractor of FIG. 1 with parts removed.

The present invention relates to a vehicle seat belt webbing retractor, and, in particular, to a retractor including a belt webbing clamp assembly for blocking withdrawal of belt webbing from the retractor. The present invention is applicable to various retractor constructions. As representative of the present invention, FIG. 1 illustrates a seat belt webbing retractor 10. The retractor 10 is incorporated in a three-point continuous loop seat belt system 12 for use in restraining an occupant of a vehicle.

During operation of the vehicle, the occupant of the vehicle sits on a seat 14 which is illustrated as a front passenger seat in the vehicle. A length of belt webbing 16 is extensible about the vehicle occupant. One end of the length of belt webbing 16 is anchored to the vehicle body 18 at an anchor point 20 located on one side of the seat 14. The opposite end of the belt webbing 16 is attached to the retractor 10 which is secured to the vehicle body 18 on the same side of the seat 14. Intermediate its ends, the belt webbing 16 passes through a tongue assembly 22 and a D-ring 24 that is located above the retractor 10 and the anchor point 20. When the seat belt system 12 is not in use, the belt webbing 16 is wound on the retractor 10 and is oriented generally vertically on the one side of the seat 14, as shown in solid lines in FIG. 1.

To engage the seat belt system 12, the tongue assembly 22 is manually grasped and is pulled across the lap and torso of the occupant sitting in the seat 14. As the tongue assembly 22 is pulled across the lap and torso of the occupant, the tongue assembly moves along the belt webbing 16, and the belt webbing is unwound from the retractor 10. When the belt webbing 16 has been pulled across the lap and torso of the occupant, the tongue assembly 22 is connected with a buckle 26, as shown in dashed lines in FIG. 1. The buckle 26 is connected to the vehicle body 18 and is disposed on the side of the seat 14 opposite the anchor point 20. When the seat belt system 12 is thus buckled, the length of belt webbing 16 is divided by the tongue assembly 22 into a torso portion 28 which extends across the torso of the occupant and a lap portion 30 which extends across the lap of the occupant.

The retractor 10 (FIGS. 2 and 3) includes a frame 40 which is fixed to the vehicle body 18 in a manner not shown. The frame 40 is a single piece of sheet metal stamped and formed to a U-shaped configuration as best seen in FIG. 3. The frame 40 includes a back wall 42 and spaced parallel side walls 44 and 46 which extend generally perpendicular to the back wall.

A generally circular opening 48 is formed in one frame side wall 44. A generally circular opening 50, identical to the opening 48, is formed in the opposite frame side wall 46. The openings 48 and 50 are centered on a primary axis 52 of the retractor 10. The primary axis 52 extends between the frame side walls 44 and 46 in a direction parallel to the frame back wall 42.

A series of fixed teeth 60 are formed on one sector of the outer periphery of the opening 50 in the frame side wall 46. The fixed teeth 60 are disposed at a location generally below the primary axis 52 and on a side of the primary axis opposite from the back wall 42 of the frame 40. A wedge-shaped lock pawl opening 62 is formed on the outer periphery of the circular opening 50 in the frame side wall 46. The lock pawl opening 62 is disposed at a location generally below the primary axis 52 and between the primary axis and the back wall 42 of the frame 40. Four sensor plate support openings 64 are formed in the frame side wall 46. The upper portion of the side wall 46 also includes an opening 66 for receiving parts of a belt webbing clamp mechanism 270 described below.

The frame side wall 44 is a mirror image of the frame side wall 46. The frame side wall 44 includes a series of fixed teeth 70 on the outer periphery of the opening 48. The frame side wall 44 also includes a wedge-shaped lock pawl opening 72 on the outer periphery of the opening 48. Four spring plate support openings 74 are formed in the frame side wall 44. The upper portion of the side wall 44 includes a belt webbing clamp mechanism opening 76.

A sensor plate 80 (FIGS. 3, 7 and 8) is fixed to the frame side wall 46. The sensor plate 80 is a one-piece plastic molding and includes a planar main wall portion 82 disposed in abutting engagement with the frame side wall 46. Four support pins (not shown) extend from the main wall portion 82 into the support pin openings 64 in the frame side wall 46. The support pins secure the sensor plate 80 in position on the side wall 46 of the frame 40. An outer peripheral rim 86 of the sensor plate 80 projects axially from the main wall portion 82 in a direction toward the opposite side wall 44 of the frame 40. The rim 86 wraps around the lower portion of the side wall 46 of the frame 40.

The sensor plate 80 has an initiator pivot pin opening 90 and an initiator link post opening 92 which overlie the clamp mechanism opening 66 in the frame side wall 46. An upper link arm stopper 93 is disposed below the initiator link post opening 92 and projects axially in a direction away from the frame side wall 46. A clamp housing support notch 96 is formed on the upper edge of the sensor plate 80. A lock pawl opening 208 and a lock pawl pivot opening 210 are disposed near the bottom of the sensor plate 80 and overlie the lock pawl opening 62 in the frame side wall 46.

The sensor plate 80 has a bearing section 100 which includes a cylindrical hub 102. The hub 102 is normally centered on the primary axis 52 of the retractor 10. A circular array of support arms 104 connects the hub 102 with the main wall portion 82 of the sensor plate 80. The support arms 104 are flexible and support the hub 102 for limited movement, relative to the main wall portion 82 and the primary axis 52, in a first direction indicated by the arrow 110 in FIG. 8 and in an opposite second direction 112.

The sensor plate 80 further includes three assembly tabs 140 (FIGS. 2 and 3) which project radially outward from the hub 102. The assembly tabs 140 are spaced apart from and extend parallel to the main wall portion 82 of the sensor plate 80 as can be seen in FIG. 2.

The retractor 10 includes a spring plate 150 (FIGS. 2 and 3) which is substantially similar to the sensor plate 80. The spring plate 150 is a one-piece plastic molding which includes a planar main wall portion 152 disposed in abutting engagement with the frame side wall 44. Four support pins 154 on the main wall portion 152 of the spring plate 150 extend into the openings 74 in the frame side wall 44 to secure the spring plate on the frame side wall.

An outer peripheral rim 156 of the spring plate 150 projects axially from the main wall portion 152 in a direction toward the opposite side wall 46 of the frame 40. A clamp housing support notch 157 is formed in the upper edge of the spring plate 150. A circular initiator pivot pin opening 158 overlies the clamp mechanism opening 76 in the frame side wall 44. A lock pawl pivot opening 159 near the bottom of the spring plate 150 overlies the lock pawl opening 72 in the frame side wall 44.

The spring plate 150 includes a bearing section 160 which is similar to the bearing section 100 of the sensor plate 80. The bearing section 160 includes a cylindrical hub 162 which is normally centered on the primary axis 52 of the retractor 10. The hub 162 is supported by a circular array of flexible support arms 164 for movement, relative to the primary axis 52 and the main wall portion 152, in the first and second directions 110 and 112, respectively.

The retractor 10 includes a spool 170 (FIGS. 2 and 3). The spool 170, as illustrated, is a multi-piece structure including a reel 172 on which the belt webbing 16 is wound, a pair of spool locking ratchet wheels 178, and a shaft 182. It should be understood that spools having other configurations can be used, such as a spool which is formed as one piece.

The reel 172 has a cylindrical outer surface 174 centered on a spool axis 176. An end portion of the belt webbing 16 extends through a webbing slot 177 in the reel 172 and is secured to the reel in a known manner (not shown). The spool axis 176 is normally coincident with the primary axis 52 of the retractor 10. The spool axis 176 is movable relative to the primary axis 52, together with the hubs 102 and 162, in a manner described below. The spool locking ratchet wheels 178 are disposed at opposite ends of the reel 172 and are fixed for rotation with the reel. A plurality of ratchet teeth 180 are disposed in a circular array on the outer periphery of each spool locking ratchet wheel 178.

The cylindrical metal shaft 182 (FIGS. 2 and 3) is fixed for rotation with the reel 172. A first end portion 184 (FIG. 2) of the shaft 182 projects axially from the left end (as viewed in FIG. 2) of the reel 172. The first end portion 184 of the shaft 182 is journalled for rotation in the hub 162 of the spring plate 150. A second end portion 186 (FIGS. 2 and 3) of the shaft 182 projects axially from the right end (as viewed in FIG. 2) of the reel 172. The second end portion 186 of the shaft 182 is journalled for rotation in the hub 102 of the sensor plate 80. The spool 170 is thereby supported for rotation about the primary axis 52, relative to the frame 40, in a belt retraction direction 190 (FIG. 5) and in an opposite belt withdrawal direction 192.

A rewind spring mechanism indicated schematically at 194 (FIG. 2) is disposed on the side of the frame side wall 44 opposite the reel 172. The rewind spring mechanism 194 includes a cover 196 connected with the frame 40 in a manner not shown. A spring 198 is connected between the cover 196 and the first end portion 184 of the shaft 182. The spring 198 biases the spool 170 for rotation in the belt retraction direction 190. It should be understood that other types of rewind mechanisms can be used, such as one including a separate spring driver element fixed on the end portion 184 of the spool shaft 182.

A lock pawl 200 (FIG. 3) is disposed adjacent to the spool locking ratchet wheels 178. The lock pawl 200 is preferably made from metal and includes at its opposite ends a pair of locking arms 202 and 204. The lock pawl 200 extends through the lock pawl openings 72 and 62 in the frame 40. Pivot arms 206 project from opposite ends of the lock pawl 200 and are supported in the lock pawl pivot openings 210 and 159 in the sensor plate 80 and the spring plate 150, respectively. The lock pawl 200 is thereby supported for pivotal movement relative to the frame 40. A cam tab 210 of the lock pawl 200 extends axially outward from the one locking arm 204 through the lock pawl opening 208 in the sensor plate 80 in a direction away from the frame 40.

A clutch support or pilot ratchet 220 is fixed for rotation with the spool 170. The pilot ratchet 220 includes a hub portion 222 (FIG. 2) secured to the second end portion 186 of the shaft 182 in a manner not shown, such as by a key and slot assembly, to fix the pilot ratchet for rotation with the spool 170 in a predetermined angular orientation relative to the spool. A plurality of pilot ratchet teeth 224 are disposed in a circular array on the outer periphery of the pilot ratchet 220.

An actuator 230 (FIGS. 2-4) is supported on the hub 102 of the sensor plate 80 for limited rotation relative to the frame 40 about the primary axis 52. A return spring (not shown) acting between the actuator 230 and the sensor plate 80 biases the actuator against rotation in the belt withdrawal direction 192. The actuator 230 has a radially extending disk portion 232 which defines a circular central opening 234 of the actuator. Three assembly slots 236 extend radially outward from the central opening 234. The assembly tabs 140 on the sensor plate 80 are, during assembly of the retractor 10, inserted through the assembly slots 236 in the actuator 230. The actuator 230 is then rotated in the direction 190 (FIG. 5) relative to the sensor plate 80 to the position shown in FIG. 5. The assembly tabs 140 hold the disk portion 232 of the actuator 230 in position against the sensor plate 80.

The actuator 230 has a cam portion 242 that extends radially outward from the disk portion 232. A cam support 243 extends axially from the cam portion 242 of the actuator 230 in a direction toward the frame 40. A cam slot 244 is formed in the cam support 243. The cam slot 244 receives the cam tab 210 of the lock pawl 200.

A sensor reinforcement tab 245 and a sensor receptor 246 project axially from a lower portion of the actuator 230 in a direction away from the frame 40. The actuator 230 also includes a lower link arm pivot post 248 which projects axially from an upper portion of the actuator in a direction away from the frame 40. The sensor receptor 246, the lower link arm pivot post 248 and the cam support 243 are fixed for rotation with the actuator 230, relative to the frame 40, about the primary axis 52.

The retractor 10 includes a vehicle deceleration sensing assembly 250 (FIGS. 3-6) for sensing sudden vehicle deceleration such as occurs in a vehicle collision. The vehicle deceleration sensing assembly 250 includes an inertia mass 252, which is preferably a steel ball. The inertia mass 252 rests in a cavity 254 in a sensor housing 256. The sensor housing 256 is supported on the sensor receptor 246 of the actuator 230.

A sensor lever 258 is supported by a pair of pivot pins on the sensor housing 256 for pivotal movement relative to the sensor housing. The sensor lever 258 rests upon the inertia mass 252 and has a tooth 260 which extends upward and radially in a direction toward the pilot ratchet teeth 224 on the pilot ratchet 220. The tooth 260 on the sensor lever 258 is disposed axially coincident with (i.e., lies in the same plane as) the pilot ratchet teeth 224 on the pilot ratchet 220. The sensor lever 258 normally is disposed, under the influence of gravity, in a position in which the tooth 260 is spaced downward from and radially outward from the pilot ratchet teeth 224 on the pilot ratchet 220.

The retractor 10 includes a primary belt locking mechanism which, in the preferred embodiment, is a belt webbing clamp assembly 270. The clamp assembly 270 includes a clamp housing 272 which extends through the clamp mechanism openings 66 and 76 of the frame 40 and which is received and supported in the support notches 96 and 157 in the sensor plate 80 and the spring plate 150, respectively.

Figure 5:
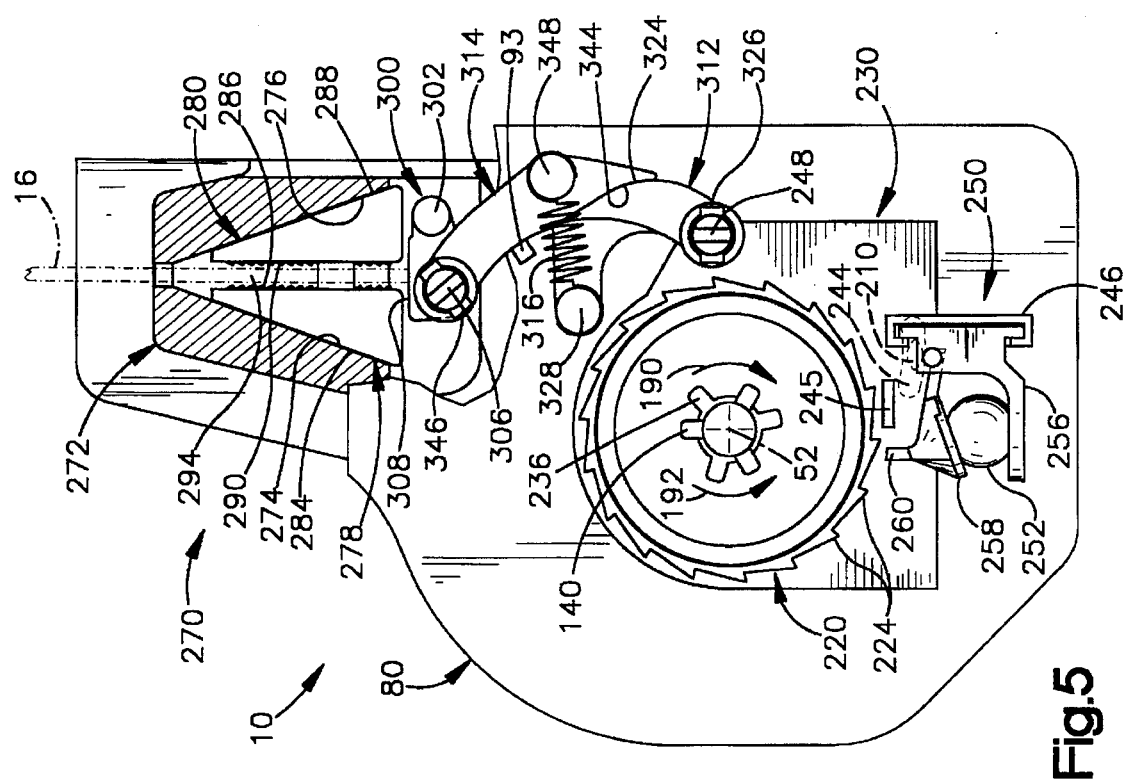
FIG. 5 is a schematic end view of parts of the retractor of FIG. 1 including a vehicle deceleration sensing mechanism and a primary belt locking mechanism shown in an unactuated condition.

The belt webbing 16 extends through a webbing slot 273 in the clamp housing 272. The clamp housing 272 has a planar first sliding surface 274 (FIG. 5). A planar second sliding surface 276 is presented toward, but at an angle to, the first sliding surface 274.

A pair of clamp members 278 and 280 are supported in a known manner between the sliding surfaces 274 and 276 for sliding movement relative to the clamp housing 272. The first clamp member 278 is generally wedge-shaped in cross-sectional configuration. The first clamp member 278 has a planar sliding surface 284 in abutting engagement with the first sliding surface 274 on the clamp housing 272. The first clamp member 278 also has a planar clamping surface 286 with a plurality of teeth. The clamping surface 286 is inclined relative to the sliding surface 284.

The second clamp member 280 is similar in configuration to the first clamp member 278. The second clamp member 280 has a planar sliding surface 288 in abutting engagement with the second sliding surface 276 on the clamp housing 272. The second clamp member 280 has a planar clamping surface 290 presented toward the clamping surface 286 of the first clamp member 278. The clamping surface 290 is inclined to the sliding surface 288. A plurality of teeth are formed on the clamping surface 290 of the second clamp member 280. The clamp members 278 and 280, and particularly the clamping surfaces 286 and 290, define between them a belt webbing passage 294 through which the belt webbing 16 is movable when the spool 170 rotates in the belt retraction direction 190 and the belt withdrawal direction 192.

The clamp members 278 and 280 are connected in a known manner for providing simultaneous sliding movement of the clamp members relative to the clamp housing 272. Thus, the clamp members 278 and 280 move in a direction toward or away from each other while they simultaneously slide (upward or downward as viewed in FIG. 5) relative to the clamp housing 272. A return spring (not shown) biases the clamp members 278 and 280 outwardly away from each other and downward as viewed in FIG. 5, into an unactuated or released position shown in FIG. 5.

The clamp assembly 270 (FIG. 3) also includes an initiator 300 for effecting movement of the clamp members 278 and 280. At one end of the initiator 300, a cylindrical pivot pin 302 extends through the opening 66 in the frame side wall 46 and through the opening 90 in the sensor plate 80. A pivot pin 304 at the opposite end of the initiator 300 extends through the opening 76 in the frame side wall 44 and through the opening 158 in the spring plate 150. The pivot pins 302 and 304 support the initiator 300 for pivotal movement relative to the frame 40.

Figure 6:
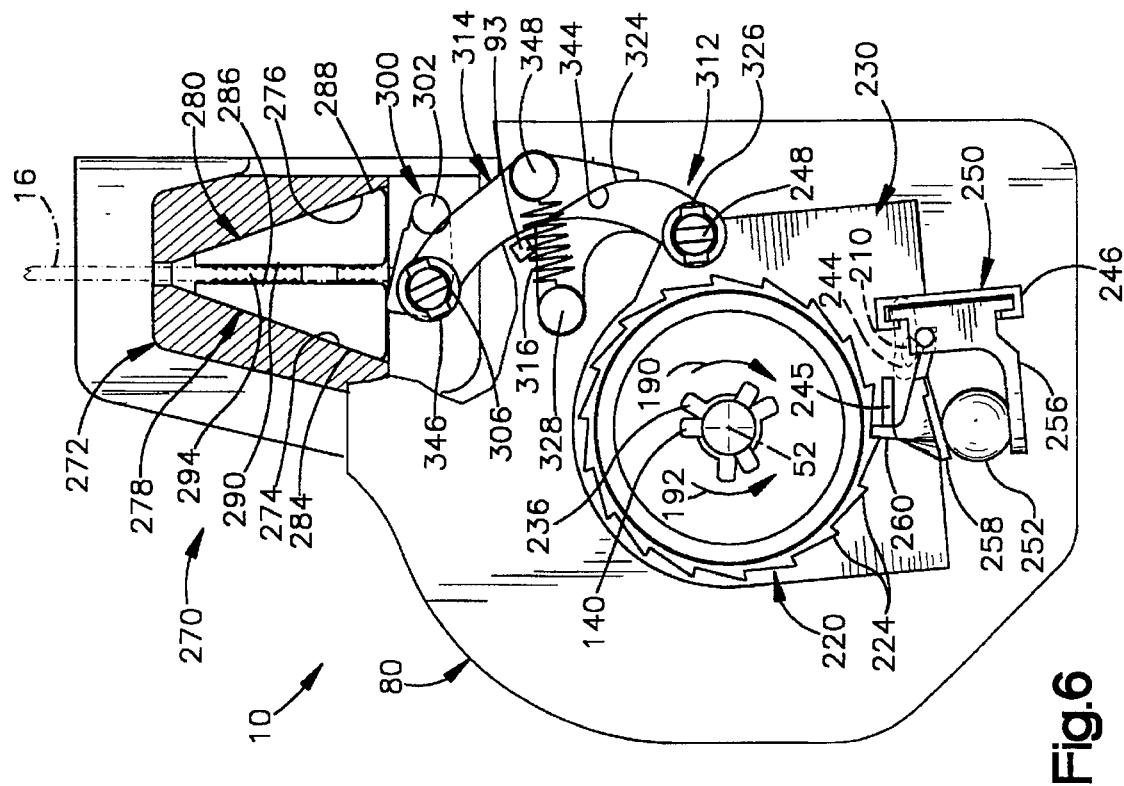
FIG. 6 is a view similar to FIG. 5 showing the vehicle deceleration sensing mechanism and the primary belt locking mechanism in an actuated condition.

The initiator 300 has a link post 306 which extends through the opening 66 in the side wall 46 of the frame 40 and through the opening 92 in the sensor plate 80. An upwardly presented engagement surface 308 on the initiator 300 adjoins the first clamp member 278. The engagement surface 308 is engageable with the first clamp member 278, in a manner described below, to move the first clamp member, and thereby the second clamp member 280, to an actuated or engaged condition as shown in FIG. 6. The initiator 300 also has a webbing slot 309, adjacent to the engagement surface 308, through which the belt webbing 16 extends between the spool 170, the belt webbing passage 294, and the webbing slot 273 in the clamp housing 272.

A link assembly 310 (FIG. 4) interconnects the actuator 230 and the clamp mechanism 270. The link assembly 310 includes a lower link arm 312, an upper link arm 314, and a link assembly spring 316.

The lower link arm 312 (FIG. 4) has a main body portion 320. An arcuate engagement surface 324 on the main body portion 320 of the lower link arm 312 is presented toward the upper link arm 314. A hub 326 at the lower end of the lower link arm 312 is snapped on the lower link arm pivot post 248 (FIGS. 4 and 5) of the actuator 230. The lower link arm 312 is thus supported for pivotal movement relative to the actuator 230. A spring support post 328 is formed on a planar extension 330 of the lower link arm 312. The spring support post 328 projects axially from the lower link arm 312 in a direction away from the frame 40. A spring retainer rib 332 is formed on the spring support post 328.

The upper link arm 314 is similar in configuration to the lower link arm 312 and includes an arcuate main body portion 340. An arcuate engagement surface 344 on the main body portion 340 of the upper link arm 314 is presented toward the lower link arm 312. The engagement surface 344 on the upper link arm 314 is disposed in abutting engagement with the engagement surface 324 on the lower link arm 312 as shown in FIG. 5.

A hub 346 at the upper end of the upper link arm 314 is snapped on the link post 306 (FIG. 5) of the initiator 300. The upper link arm 314 is thereby supported for pivotal movement relative to the initiator 300. The upper link arm 314 further includes a spring support post 348 (FIG. 4) which projects axially in a direction away from the frame 40. A spring retainer rib 350 is formed on the spring support post 348.

The link assembly spring 316 is a tension spring having a first end portion 354 received on the spring support post 348 of the upper link arm 314 between the spring retainer rib 350 and the main body portion 340 of the upper link arm. A second end portion 356 of the link assembly spring 316 is received on the spring support post 328 Of the lower link arm 312 between the spring retainer rib 332 and the main body portion 320 of the lower link arm. The link assembly spring 316 biases the upper link arm 314 and the lower link arm 312 toward each other, into a position as shown in FIG. 5. The link assembly spring 316 thus connects the upper link arm 314 for movement with the lower link arm 312.

FIG. 5 illustrates the position of selected parts of the retractor 10 when the vehicle in which the retractor is mounted is not experiencing deceleration above a predetermined deceleration. The inertia mass 252 rests at the bottom of the cavity 254 in the sensor housing 256. The tooth 260 on the sensor lever 258 is spaced from the pilot ratchet teeth 224 on the pilot ratchet 220. The actuator 230 is in a first position of rotation, about the primary axis 52 of the retractor 10, as shown in FIG. 5. The first and second clamp members 278 and 280 are spaced apart from each other, and the belt webbing 16 is movable through the passage 294 between the first and second clamp members. The lock pawl 200 is in a position spaced apart from the ratchet teeth 180 on the spool 170. The ratchet teeth 180 (seen also in FIG. 7) are spaced apart from and are rotatable relative to the fixed teeth 60 and 70 on the frame side walls 46 and 44, respectively. The hub 102 on the sensor plate 80 and the hub 162 on the spring plate 150 are concentric with the primary axis 52 of the retractor 10. The spool axis 176 is coincident with the primary axis 52 of the retractor 10 and the spool 170 is supported for rotation about the primary axis of the retractor.

In the event of vehicle deceleration above a predetermined deceleration, the inertia mass 252 moves relative to the sensor housing 256. The movement of the inertia mass 252 causes the sensor lever 258 to pivot upward from the position shown in FIG. 5 to the position shown in FIG. 6.

The tooth 260 on the sensor lever 258 moves into engagement with the pilot ratchet 220. Rotation of the spool 170 and the pilot ratchet 220 in the belt withdrawal direction 192 causes the next available ratchet tooth 224 on the pilot ratchet to engage the sensor lever 258.

Thereafter, the sensor lever 258 transmits rotational force from the pilot ratchet 220 into the sensor reinforcement tab 245 and thus to the actuator 230. This rotational force causes the actuator 230 to pivot or rotate in a counterclockwise direction (as viewed in FIGS. 5 and 6) about the primary axis 52 of the retractor 10. The actuator 230 moves from the first position shown in FIG. 5 to a second position as shown in FIG. 6. In a preferred embodiment of the invention, the actuator rotates approximately 16° about the primary axis 52 between the first position and the second position.

As the actuator 230 rotates, the lower link arm support post 248 on the actuator moves in an arcuate path centered on the primary axis 52. This arcuate movement of the support post 248 causes the hub 326 on the lower link arm 312 to move in the same arcuate path. Because the link assembly spring 316 is holding the engagement surface 344 of the upper link arm 314 against the engagement surface 324 of the lower link arm 312, the force of the moving lower link arm is transmitted to the upper link arm to move the upper link arm. Because of the pivot connections at the hubs 326 and 346 of the lower and upper link arms 312 and 314, respectively, and because the initiator 300 is itself supported for pivotal movement in the openings 90 and 158 in the sensor plate 80 and the spring plate 150, respectively, the hub 346 of the upper link arm moves in a direction so as to pivot the initiator from the unactuated position shown in FIG. 5 to the actuated condition shown in FIG. 6.

The engagement surface 308 on the initiator 300 moves generally upward as viewed in FIGS. 5 and 6. The upward movement of the engagement surface 308 results in upward movement of the first clamp member 278 and, thereby, of the second clamp member 280. The sliding surface 284 on the first clamp member 278 slides along the first sliding surface 274 on the clamp housing 272. The sliding surface 288 on the second clamp member 280 slides along the second sliding surface 276 on the clamp housing 272. The clamp members 278 and 280 move upward and also move toward each other, partially closing the belt webbing passage 294. The clamping surface 286 on the first clamp member 278 and the clamping surface 290 on the second clamp member 280 engage opposite sides of the belt webbing 16. The teeth of the clamp members 278 and 280, respectively, dig into the material of the belt webbing 16. The webbing clamp assembly 270 is in the engaged condition shown in FIG. 6. Movement of the belt webbing 16 upward as viewed in FIG. 6, that is, out of the retractor 10, pulls the clamp members 278 and 280 closer toward each other and tightens the belt webbing clamp assembly 270. This places the webbing clamp assembly 270 in a clamping condition and blocks withdrawal of the belt webbing 16 from the spool 170 and the retractor 10, restraining forward movement of the vehicle occupant.

FIG. 7 illustrates the position of other parts of the retractor 10 when the belt webbing clamp assembly 270 is in the engaged condition shown in FIG. 6. The hub 102 of the sensor plate 80 and the hub 162 of the spring plate 150 remain centered on the primary axis 52 of the retractor 10. The spool 170 remains in a position in which the spool axis 176 is coincident with the primary axis 52 of the retractor 10. The ratchet teeth 180 on the spool 170 remain spaced apart from the fixed teeth 60 and 70 on the frame 40.

Upon the cessation of vehicle deceleration above the predetermined deceleration and the release of the tensile forces on the belt webbing 16, the vehicle deceleration sensing assembly 250 returns to the position shown in FIG. 5. The actuator return spring (not shown) moves the actuator 230 back to the first position shown in FIG. 5. The initiator 300 and the link arms 312 and 314 move back to the unactuated condition shown in FIG. 5. Upon the release of tensile forces on the belt webbing 16, the clamp members 278 and 280 move back to the released condition shown in FIG. 5. The belt webbing 16 thus becomes freely movable through the passage 294 in the belt webbing clamp assembly 270.

When the actuator 230 pivots between the first position shown in FIG. 5 and the second position shown in FIG. 6, the surfaces defining the cam slot 244 in the actuator move relative to the cam tab 210 of the lock pawl 200. The lock pawl 200 is pivoted toward a position in engagement with the spool ratchet teeth 180. However, the dimensions of the cam slot 244 are selected so that the actuator 230 must rotate approximately 20° about the primary axis 52 in order to cam the lock pawl 200 into engagement with the spool ratchet teeth 180, while the belt webbing clamp assembly 270 attains the engaged condition after only about 16° of rotation of the actuator. Thus, the lock pawl 200 does not normally move into the path of rotation of the ratchet teeth 180 on the spool 170 when the clamp assembly 270 attains the engaged condition shown in FIG. 6. As a result, the belt webbing clamp assembly 270 normally blocks withdrawal of belt webbing 16 from the retractor 10, thus stopping rotation of the spool 170, prior to the lock pawl 200 engaging the spool ratchet teeth 180.

In some circumstances, such as when an extraordinary tensile force is placed on the belt webbing 16, it is possible that the belt webbing may slip through the passage 294 between the engaged clamp members 278 and 280. In other circumstances, the clamp mechanism 270 may be physically blocked from moving into the engaged condition shown in FIG. 6. In either of these cases, the clamp assembly 270 does not block withdrawal of belt webbing 16 from the spool 170. The tensile force on the belt webbing 16 causes the spool 170 to continue to rotate in the belt withdrawal direction 192. The pilot ratchet 220 and thus the actuator 230 continue to rotate in the belt withdrawal direction 192. The actuator 230 is, as a result, driven to rotate about 4° farther in the belt withdrawal direction 192, past the second position shown in FIGS. 6 and 7 and into a third position as shown in FIG. 8. (It should be understood that FIG. 8 illustrates the condition of parts of the retractor 10 in the circumstance when the belt webbing slips through the passage 294 between the engaged clamp members 278 and 280. In circumstances when the clamp mechanism 270 is physically blocked from moving into the engaged condition shown in FIG. 6, the clamp members 278 and 280, the initiator 300, and the upper link arm 314 would remain in substantially the same position as shown in FIG. 5 while the lower link arm 312 would be in substantially the same position as shown in FIG. 8.)

The rotation of the actuator 230 into the third position actuates a secondary belt locking mechanism of the retractor 10. Specifically, as the actuator 230 rotates from the second position to the third position, the surfaces defining the cam slot 244 on the actuator 230 lift the cam tab 210 of the lock pawl 200 so that the locking arms 202 and 204 of the lock pawl engage the ratchet teeth 180 on the spool 170. Because the spool 170 is supported on the movable hubs 102 and 162 of the sensor plate 80 and the spring plate 150, respectively, the force exerted by the belt webbing 16 on the spool overcomes the resistance of the hub support arms 104 and 164, allowing the hubs and, thus, the shaft 182 to move.

The lock pawl 200 acts as a fulcrum for pivoting movement of the spool 170. The spool 170 pivots and shifts or moves radially, in the first direction 110, away from the primary axis 52. The spool axis 176 is no longer coincident with the primary axis 52. The ratchet teeth 180 on the spool locking ratchet wheels 178 on the spool 170 engage the fixed teeth 60 and 70 on the side walls 46 and 44, respectively, of the frame 40. The spool 170 is thereby blocked from rotation in the belt withdrawal direction 192. Thus, belt webbing 16 can not be withdrawn from the retractor 10, even though the belt webbing clamp assembly 270 is not in a clamping condition blocking the withdrawal of the belt webbing from the retractor. As a result, the vehicle occupant is restrained.

During actuation of the secondary belt locking mechanism, that is, during the movement of the actuator 230 from the second position shown in FIGS. 6 and 7 to the third position shown in FIG. 8, the lower link arm support post 248 on the actuator rotates about the spool axis 176. Thus, the force of the rotating actuator 230 is transmitted to the lower link arm 312 and the lower link arm continues to move relative to the frame 40. If the clamp assembly 270 is blocked from movement into the engaged position shown in FIG. 6, the initiator 300 and the upper link arm 314 also can not move into the position shown in FIG. 6. However, because the lower link arm 312 is movable relative to the upper link arm 314, the engagement surface 324 on the lower link arm slides along the engagement surface 344 of the upper link arm. The link arm 312 moves relative to the upper link arm 314, against the bias of the link assembly spring 316, to the position shown in FIG. 80 As the link assembly spring 316 is extended, the upper link arm 314 is held stationary by the upper link arm stopper 93. The continued movement of the lower link arm 312 relative to the upper link arm 314 allows the actuator 230 to rotate into the third position shown in FIG. 8 without consequent movement of the upper link arm. Thus, the secondary belt locking mechanism of the retractor 10 can be engaged without forcing and possibly damaging parts of the retractor 10 such as the actuator 230, the upper link arm 314, the clamp assembly 270, the sensor assembly 250, and the pilot ratchet 220.

This same result is obtained if the clamp assembly 270 is able to attain the engaged position shown in FIG. 6 but is unable to block the withdrawal of belt webbing 16 from the spool 170. When this occurs, the spool 170 continues to rotate and moves the actuator 230 from the second position shown in FIGS. 6 and 7 to the third position shown in FIG. 8. The force of the rotating actuator 230 is transmitted to the lower link arm 312 and the lower link arm continues to move relative to the frame 40. The engagement surface 324 on the lower link arm 312 slides along the engagement surface 344 of the upper link arm 314, thus effectively disabling the force-transmitting connection between the lower link arm and the initiator 300. The link assembly 310 assumes the position shown in FIG. 8.

After the termination of the vehicle emergency, the resilience of the support arms 104 on the sensor plate 80 and the support arms 164 on the spring plate 150 moves the hubs 102 and 162 in the second direction 112, relative to the frame 40, back to their original position centered on the primary axis 52 of the retractor 10. Accordingly, the spool 170 is moved back to its original position in which the spool axis 176 is coincident with the primary axis 52 of the retractor 10. The release of tensile forces on the belt webbing 16 allows the actuator 230 to rotate from the third position shown in FIG. 8 to the first position shown in FIG. 5. The spring 316 returns the parts of the link assembly 310 to the position shown in FIG. 5.

From the above description of the invention, those skilled in the art will perceive improvements, changes and modifications in the invention. For example, the retractor 10 may include a webbing acceleration sensitive mechanism for effecting rotation of the actuator 230 in the event of rotation of the spool 170 in the belt withdrawal direction 192 at a rate exceeding a predetermined rate of rotation. The retractor 10 may also include an automatic locking mechanism for engaging the webbing clamp assembly 270 in response to rotation of the spool 170 in a predetermined manner. Such improvements, changes and modifications within the skill of the art are intended to be covered by the appended claims.

Having described the invention, we claim:

1. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

a belt webbing clamp mechanism having a released condition in which said belt webbing is movable through said clamp mechanism and a clamping condition in which said clamp mechanism clamps said belt webbing to block the withdrawal of belt webbing from said retractor;

sensing means for sensing a vehicle emergency situation;

an actuator which is movable in a first direction from a first position to a second position in response to said sensing means sensing an emergency situation; and first means forming a force-transmitting connection between said actuator and said clamp mechanism for actuating said clamp mechanism when said actuator moves to its second position, said first means including second means for disabling the force-transmitting connection in the event of inability of said clamp mechanism to block the withdrawal of belt webbing from said retractor.

2. A retractor as set forth in claim 1 wherein said first means comprises a link arm assembly including a first link arm and a second link arm which are releasably connected in a force-transmitting relationship between said actuator and said clamp mechanism;

a first surface on said first link arm being in engagement with a second surface on said second link arm to transmit force from said actuator through said first link arm to said second link arm to move said second link arm, said second means comprising means for enabling movement of said first surface on said first link arm relative to said second surface on said second link arm to enable movement of said actuator and of said first link arm.

3. A retractor as set forth in claim 2 wherein said first link arm has a first end portion connected with said actuator for movement with said actuator and has a second end portion including said first surface;

said second link arm having a first end portion connected with said clamp mechanism and having a second end portion including said second surface.

4. A retractor as set forth in claim 1 wherein said first means comprises a first link arm connected with said actuator for movement with said actuator, a second link arm connected with said clamp mechanism for actuating said clamp mechanism, and means for releasably interconnecting said first link arm with said second link arm to selectively couple said second link arm for movement with said first link arm in response to movement of said first link arm by said actuator.

5. A retractor as set forth in claim 4 wherein said means for releasably interconnecting said first link arm with said second link arm comprises a spring interconnecting adjoining portions of said first link arm and said second link arm.

6. A retractor as set forth in claim 1 wherein said first means comprises:

a first link arm having a first hub supported for pivotal movement on said actuator and having a first engagement surface at an end of said first link arm opposite from said hub;

a second link arm having a second hub supported for pivotal movement on said belt webbing clamp mechanism and having a second engagement surface at an end of said second link arm opposite from said second hub; and a spring biasing said first engagement surface on said first link arm into abutting engagement with said second engagement surface on said second link arm.

7. A retractor as set forth in claim 6 wherein said second means comprises means for effecting sliding movement of said first engagement surface relative to said second engagement surface in the event of inability of said clamp mechanism to block the withdrawal of belt webbing from said retractor.

8. A retractor as set forth in claim 1 wherein said actuator is supported for rotation about an axis of said retractor in response to said sensing means sensing an emergency situation, said first means comprising a first link arm which is connected with said actuator for rotation with said actuator and a second link arm which is connected with said clamp mechanism for transmitting to said clamp mechanism the force of movement of said first link arm resulting from rotation of said actuator.

9. A retractor as set forth in claim 1 wherein said first means comprises a link arm assembly connected between said actuator and said clamp mechanism;

said link arm assembly having a first condition transmitting force from said actuator to said clamp mechanism in response to movement of said actuator in the first direction from its first position to its second position to actuate said clamp mechanism;

said link arm assembly having a second condition blocking transmission of force from said actuator to said clamp mechanism to enable movement of said actuator in the first direction from the second position to a third position to actuate a secondary belt locking mechanism in the event of the inability of said clamp mechanism to block the withdrawal of belt webbing from said retractor;

said actuator being movable from the third position to the first position upon termination of said vehicle emergency situation;

said link arm assembly being movable from the second condition to the first condition in response to movement of said actuator from the third position to the first position.

10. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

a belt webbing clamp mechanism having a released condition in which said belt webbing is movable through said clamp mechanism and a clamping condition in which said clamp mechanism clamps said belt webbing to block the withdrawal of belt webbing from said retractor;

sensing means for sensing a vehicle emergency situation;

an actuator which is movable in a first direction from a first position to a second position in response to said sensing means sensing an emergency situation;

a first link arm connected with said actuator for movement with said actuator;

a second link arm connected with said clamp mechanism for actuating said clamp mechanism; and means for coupling said second link arm for movement with said first link arm in response to movement of said first link arm by said actuator.

11. A retractor as set forth in claim 10 wherein said means for coupling said second link arm for movement with said first link arm comprises a spring interconnecting adjoining portions of said first link arm and said second link arm.

12. A retractor as set forth in claim 10 wherein said means for coupling comprises a first surface on said first link arm in engagement with a second surface on said second link arm to transmit force from said actuator through said first link arm to said second link arm to move said second link arm, said first surface on said first link arm being movable relative to said second surface on said second link arm to enable movement of said actuator and of said first link arm without movement of said second link arm.

13. A seat belt retractor comprising:

a length of seat belt webbing which is extensible about a vehicle occupant to restrain the vehicle occupant;

a spool on which said belt webbing is wound, said spool being rotatable in a belt retraction direction and in an opposite belt withdrawal direction;

a belt webbing clamp mechanism having a released condition in which said belt webbing is movable through said clamp mechanism and a clamping condition in which said clamp mechanism clamps said belt webbing to block the withdrawal of belt webbing from said retractor;

sensing means for sensing a vehicle emergency situation;

an actuator which is movable in a first direction from a first position to a second position in response to said sensing means sensing an emergency situation; and a link arm assembly forming a force-transmitting connection between said actuator and said clamp mechanism;

said link arm assembly having a first condition transmitting force from said actuator to said clamp mechanism across the force-transmitting connection in response to movement of said actuator from its first position to its second position to actuate said clamp mechanism;

said link arm assembly having a second condition blocking transmission of force from said actuator to said clamp mechanism across the force-transmitting connection to enable movement of said actuator in the first direction from the second position to a third position to actuate a secondary belt locking mechanism in the event of inability of said clamp mechanism to block the withdrawal of belt webbing from said retractor;

said actuator being movable from the third position to the first position upon termination of said vehicle emergency situation;

said link arm assembly being movable from the second condition to the first condition upon movement of said actuator from the third position to the first position.

14. A retractor as set forth in claim 13 wherein said link arm assembly moves from the first condition to the second condition in the event said clamp mechanism does not move from the released condition to the clamping condition under the influence of the force transmitted from said moving actuator through said link arm assembly.

15. A retractor as set forth in claim 13 wherein said link arm assembly includes a first link arm and a second link arm which are releasably connected in a force-transmitting relationship between said actuator and said clamp mechanism, a first surface on said first link arm being disposed in abutting engagement with a second surface on said second link arm to transmit force from said actuator through said first link arm to said second link arm to move said second link arm, said first surface on said first link arm being movable relative to said second surface on said second link arm to enable movement of said actuator and of said first link arm without movement of said second link arm.

16. A retractor as set forth in claim 15 comprising a spring interconnecting adjoining portions of said first link arm and said second link arm.

* * * * *